(12) United States Patent
Grulkowski et al.

(10) Patent No.: US 11,953,142 B2
(45) Date of Patent: Apr. 9, 2024

(54) POSITION ADJUSTABLE MOUNT FOR DIRECTIONAL SPEAKER

(71) Applicant: Legrand AV Inc., Eden Prairie, MN (US)

(72) Inventors: Aaron Grulkowski, Eden Prairie, MN (US); Mark Plummer, Eden Prairie, MN (US); Mark Trebicki, Eden Prairie, MN (US); Wyatt Grunerud, Eden Prairie, MN (US)

(73) Assignee: Legrand AV Inc., Eden Prairie, MN (US)

( * ) Notice: Subject to any disclaimer, the term of this patent is extended or adjusted under 35 U.S.C. 154(b) by 160 days.

(21) Appl. No.: 17/482,052

(22) Filed: Sep. 22, 2021

(65) Prior Publication Data

US 2022/0090730 A1  Mar. 24, 2022

Related U.S. Application Data

(60) Provisional application No. 63/082,082, filed on Sep. 23, 2020.

(51) Int. Cl.
*F16M 11/14* (2006.01)
*F16M 13/02* (2006.01)
*H04R 1/02* (2006.01)

(52) U.S. Cl.
CPC ............ *F16M 11/14* (2013.01); *F16M 13/02* (2013.01); *H04R 1/026* (2013.01); *H04R 2201/021* (2013.01); *H04R 2201/025* (2013.01)

(58) Field of Classification Search
CPC ........ F16M 11/14; F16M 13/02; H04R 1/026; H04R 2201/021; H04R 2201/025
See application file for complete search history.

(56) References Cited

U.S. PATENT DOCUMENTS

| | | | |
|---|---|---|---|
| 9,877,096 B2* | 1/2018 | Harms | F16M 13/022 |
| 10,267,454 B1* | 4/2019 | Ortiz | F16M 11/041 |
| 10,299,400 B2* | 5/2019 | Wengreen | H05K 5/0204 |
| 10,434,954 B2* | 10/2019 | Hart | B60R 11/04 |
| 11,231,744 B2* | 1/2022 | Wengreen | H04R 1/026 |
| 2004/0051503 A1* | 3/2004 | Fan | H04M 1/21 320/117 |
| 2009/0072102 A1* | 3/2009 | Scott | H04R 1/026 248/205.1 |
| 2015/0144420 A1* | 5/2015 | Sakurai | H04R 1/026 181/198 |
| 2017/0255083 A1* | 9/2017 | Donaldson | G03B 17/02 |
| 2018/0367713 A1* | 12/2018 | Gilbert | H04N 23/54 |
| 2019/0236919 A1* | 8/2019 | Mehdi | H04N 23/57 |
| 2020/0096842 A1* | 3/2020 | Ramones | F16M 13/00 |

* cited by examiner

*Primary Examiner* — Monica E Millner
(74) *Attorney, Agent, or Firm* — Bradley J. Thorson (57) ABSTRACT

A mount that enables a smart home device or directional speaker to be selectively positioned so as to optimize audibility.

6 Claims, 9 Drawing Sheets

POSITION ADJUSTABLE MOUNT FOR DIRECTIONAL SPEAKER

TECHNICAL FIELD

The invention relates to mounts for speakers and smart devices, and more particularly to position adjustable mounts for directional speakers and smart devices.

BACKGROUND

Smart home assistant devices such as Amazon®, Alexa® and associated speakers such as Amazon® Echo® have become a very popular feature in modern homes and businesses. Often, these types of devices are very compact, and the small speaker in the device is made directional in order to increase audibility. In addition, it is often desirable to mount the device to a wall or other surface. Existing mounts typically are not adjustable, often causing the directional speaker to be oriented in a sub-optimal direction.

What is needed is a mount that enables a mounted device to be oriented in the optimal direction for audibility.

SUMMARY

The present invention addresses the need in the market for a mount that enables a smart home device or directional speaker to be positioned so as to optimize audibility.

In an embodiment, a mount for a smart device or directional speaker includes a device interface having a rear wall defining an opening with a periphery, a plurality of notches being defined in the periphery, the device interface further including a plurality of engaging ramps, each of the engaging ramps disposed adjacent to a separate one of the notches, and a plurality of resilient device receiving prongs projecting forwardly at an outer periphery of the rear wall, the device receiving prongs adapted to receive the smart device or directional speaker therebetween. The mount further includes a structure interface comprising a body defining a periphery, the body having an aperture for receiving a fastener to attach the body to a wall of a structure, a plurality of engaging features projecting radially from the periphery of the body, the engaging features corresponding to the notches of the device interface and receivable therein, the structure interface being selectively rotatable relative to the device interface to engage the engaging features with the engaging ramps to attach the device interface to the structure interface.

In embodiments, the engaging features are ovoid and oriented tangentially relative to a circle. The device interface can have at least three resilient device receiving prongs. The device interface can have six notches defined in the periphery of the opening in the rear wall, and the structure interface can have six engaging features corresponding to the six notches. At least one of the resilient device receiving prongs may define an opening for receiving wires therethrough.

In embodiments, the mount can further include an electrical outlet hanger, the structure interface being operably coupled to the electrical outlet hanger.

In further embodiments, a mount for a smart device or directional speaker includes a device interface having a rear wall and a plurality of resilient device receiving prongs projecting forwardly at an outer periphery of the rear wall, the device receiving prongs adapted to receive the smart device or directional speaker therebetween. The mount further includes a backing plate, a retainer plate, a biasing spring, a coupling pin defining a longitudinal axis, and a structure interface adapted to attach to a wall of a structure, the backing plate being disposed on a rear side of the structure interface, the retainer plate being disposed on a front side of the device interface, the backing plate and the retainer plate being operably coupled with the coupling pin, the biasing spring being disposed so as to bias the device interface toward the structure interface through the backing plate and the retainer plate, the device interface being selectively shiftable along the longitudinal axis defined by the coupling pin against the bias of the biasing spring between an engaged position in which the device interface abuts the structure interface and a disengaged position in which the device interface is spaced apart from the structure interface, the device interface being rotatable relative to the structure interface about the longitudinal axis when the device interface is in the disengaged position.

In embodiments, the device interface can have at least three resilient device receiving prongs. At least one of the resilient device receiving prongs may define an opening for receiving wires therethrough. The mount can further include an electrical outlet hanger, the structure interface being operably coupled to the electrical outlet hanger.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

FIGS. 1-9 there are depicted various embodiments of a mount for smart device or directional speaker. As depicted in FIGS. 1-4, in a first embodiment, mount 20 generally includes device interface 22 and structure interface 24. Device interface 22 has resilient device receiving prongs 26, 28, 30, for gripping and holding directional speaker 32. It will be appreciated that although directional speaker 32 is depicted as being spherical, other shapes such as square, rectangular, trapezoidal, or any other geometric shape may be used, and prongs 26, 28, 30, may be adapted to grip and hold the device. In addition, although three prongs 26, 28, 30, are shown, any other number of prongs, or other holding configuration conforming to the shape of directional speaker 32, such as a partial enclosure, may be used. Prong 28 defines aperture 34, enabling power and/or audio and data wires to be routed to directional speaker 32.

Rear wall 36 defines opening 38 with periphery 40. Notches 42 are defined in periphery 40 and spaced apart by approximately 60 degrees, with an engaging ramp 44 adjacent each notch 42 in a recess 45. Although six notches and engaging ramps are depicted, it will be appreciated that any other number of notches and engaging ramps may be provided in periphery 40.

Figure 2:
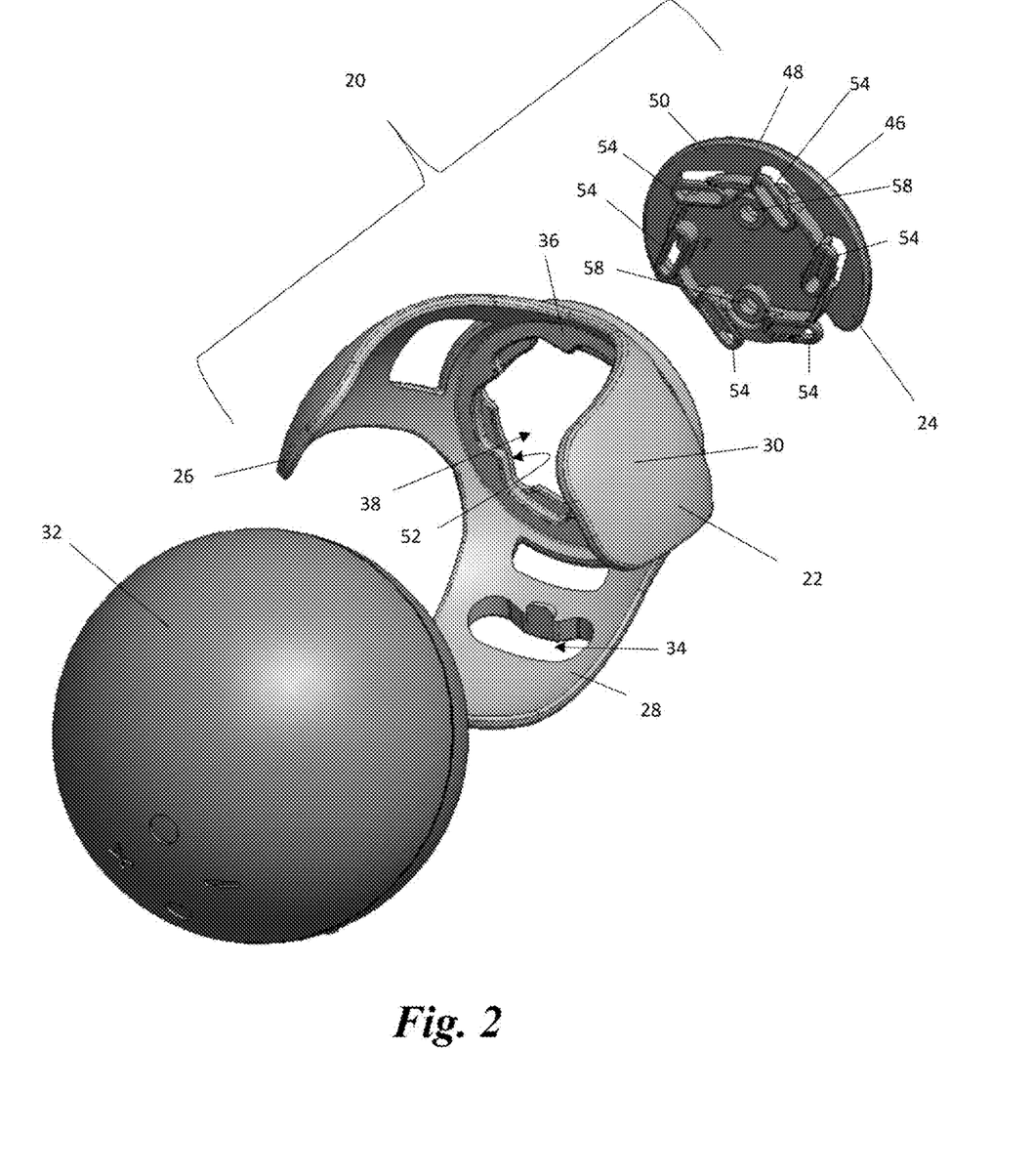
FIG. 2 is an exploded isometric view of the mount of FIG. 1.
Figure 3:
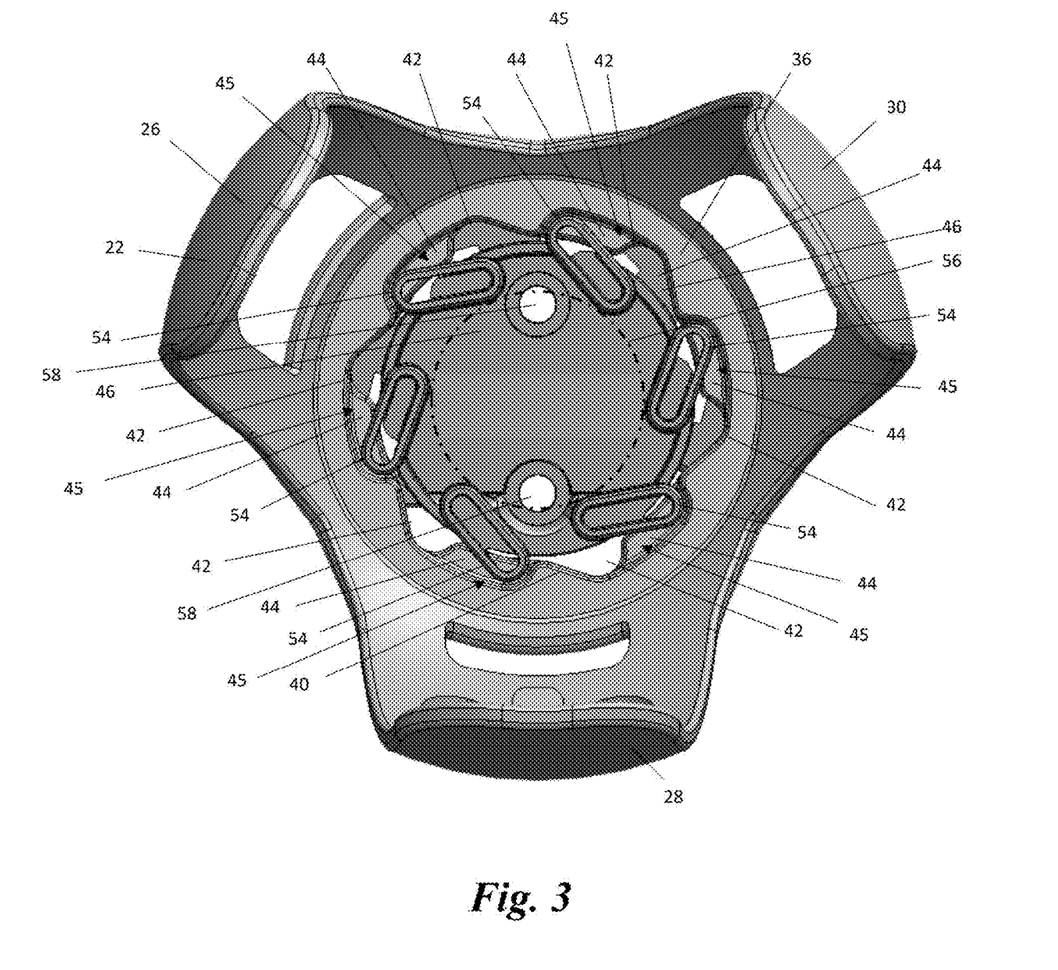
FIG. 3 is a front view of the mount of FIG. 1 with the device interface in an engaged position.

Structure interface 24 generally includes body 46 with periphery 48 being slightly larger than opening 38 in device interface 22 so that contact surface 50 abuts contact surface 52 of device interface 22 when device interface 22 is engaged with structure interface 24. Body 46 also defines ovate engaging features 54, which are spaced apart from contact surface 50 as depicted in FIG. 2 and oriented tangential to a circle 56 as depicted in FIG. 3. Apertures 58 are provided to receive fasteners (not depicted) to attach device interface 24 to a structure such as a wall, support column, or other support.

Figure 1:
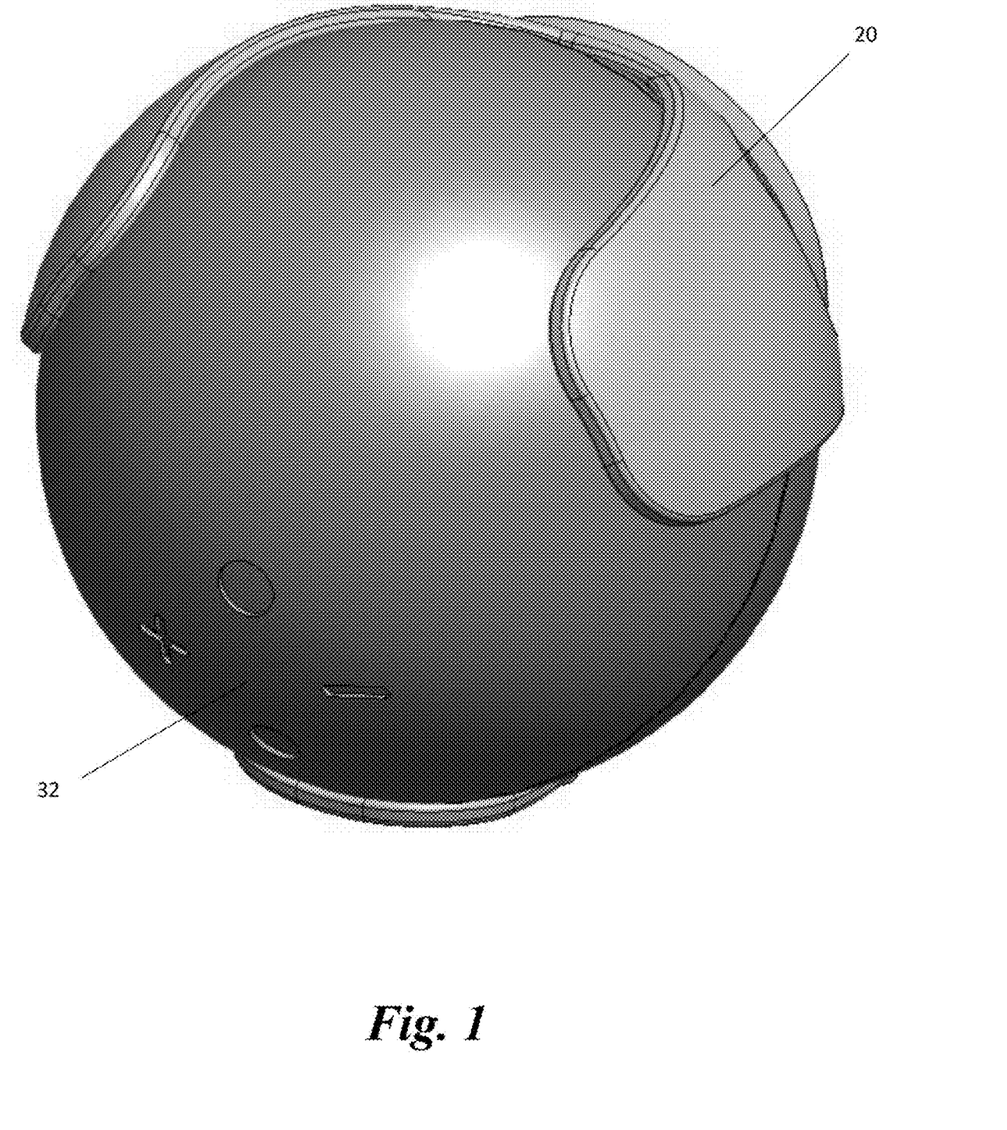
FIG. 1 is an isometric view of a mount according to an embodiment of the invention depicted holding a directional speaker.
Figure 4:
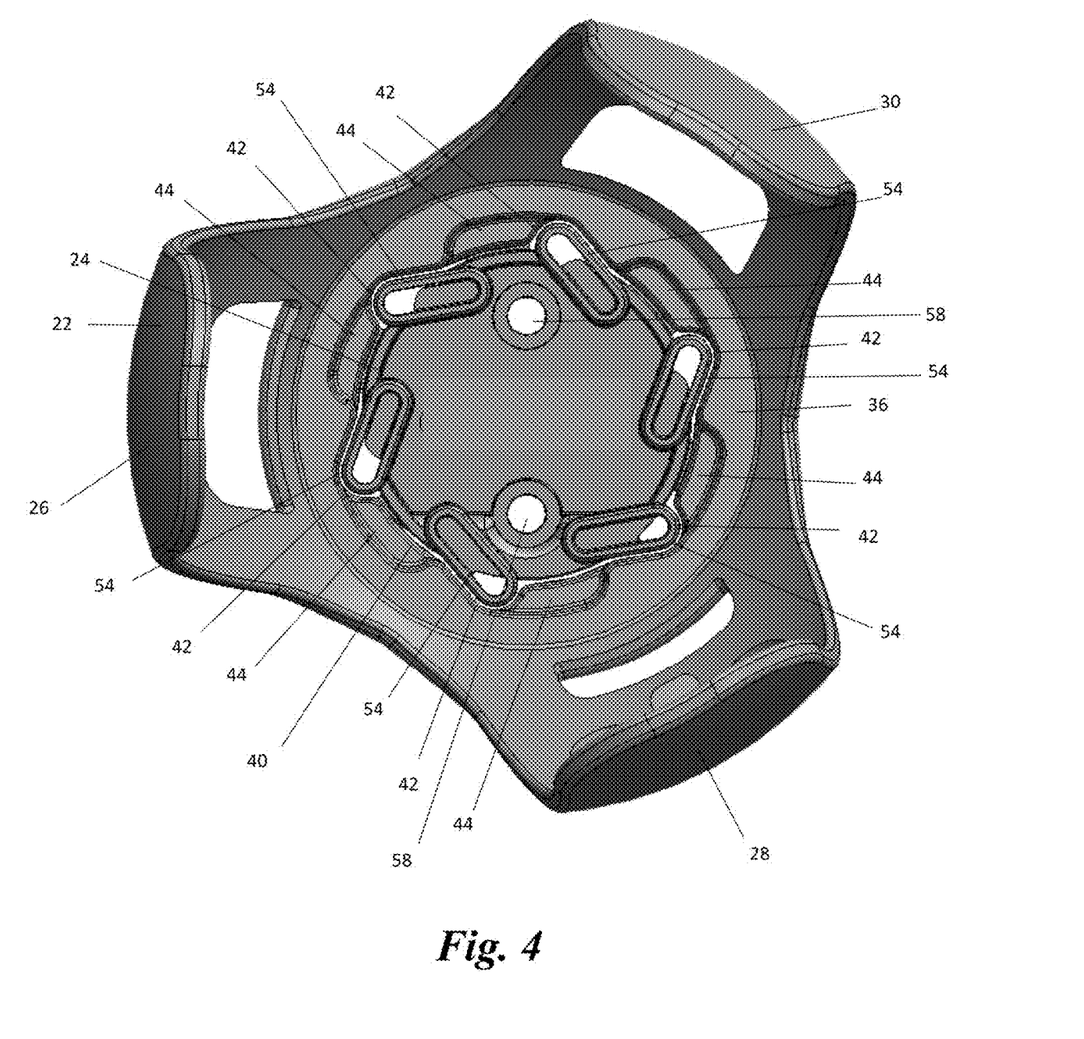
FIG. 4 is a front view of the mount of FIG. 1 with the device interface shown prior to engagement.

In use, structure interface 24 is first attached to a wall or other support with fasteners (not depicted) through apertures 58. Device interface 22 is then advanced onto structure interface 24 with engaging features 54 registered with notches 42 as depicted in FIG. 4. Device interface 22 is then rotated clockwise, causing engaging features to ride up on engaging ramps 44 until the ends of engaging features 54 contact the walls defining recesses 45. In this position, device interface 22 is securely attached to structure interface 24. Directional speaker 32 can then be inserted in prongs 26, 28, 30 to be mounted as depicted in FIG. 1. Device interface 22 can be removed by rotating device interface 22 counterclockwise until engaging features 54 register with notches 42. Device interface 22 can then be pulled away from structure interface 24. It will be appreciated that mount 20 thus provides six separate positions where directional speaker 32 can be oriented so as to optimize audibility. Again, it will also be appreciated that the number of discrete positions can be made greater or fewer by providing more or fewer notches 42, engaging ramps 44, and engaging features 54.

Figure 5:
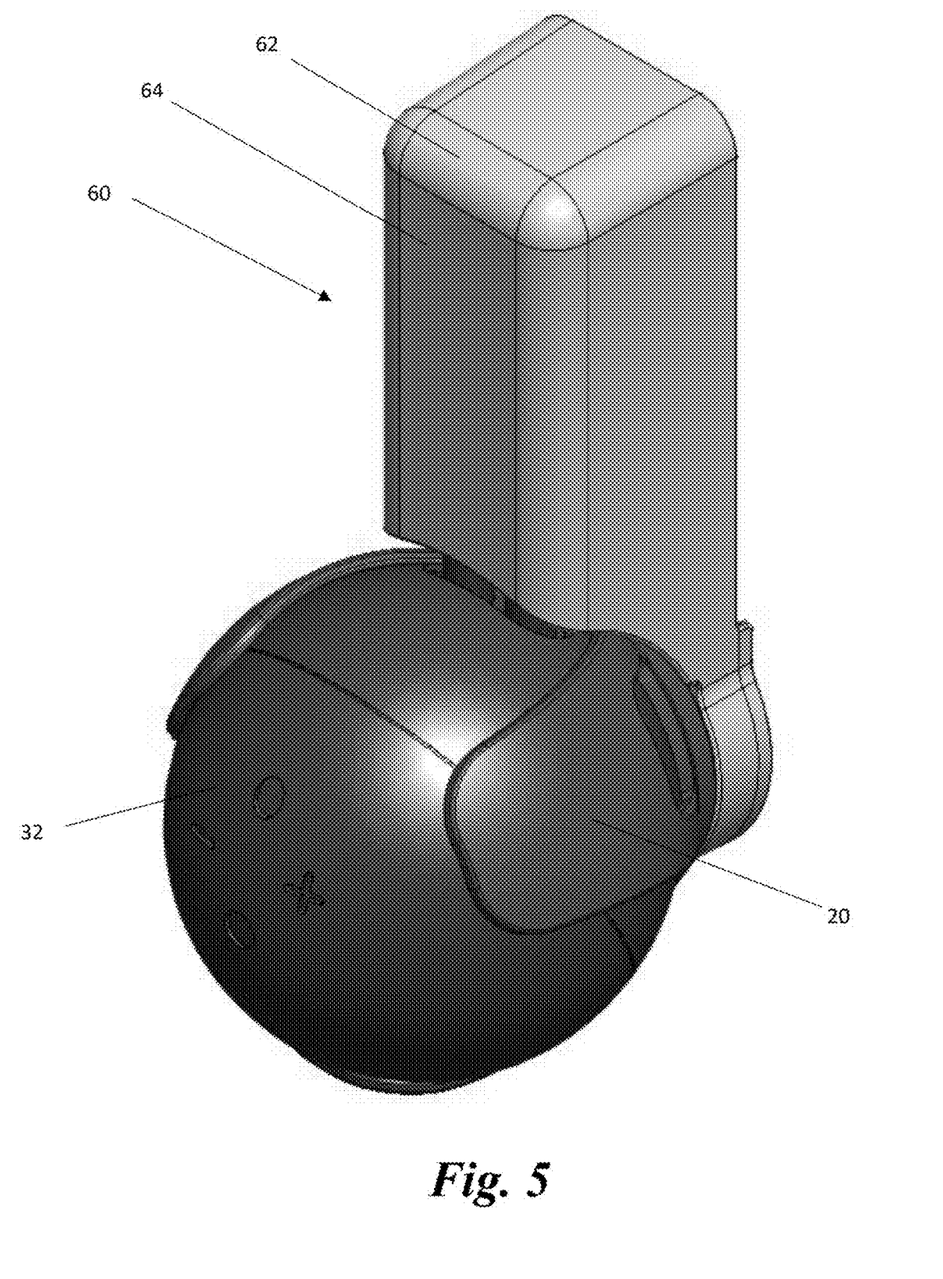
FIG. 5 is an isometric view of a mount according to another embodiment of the invention depicted holding a directional speaker.
Figure 6:
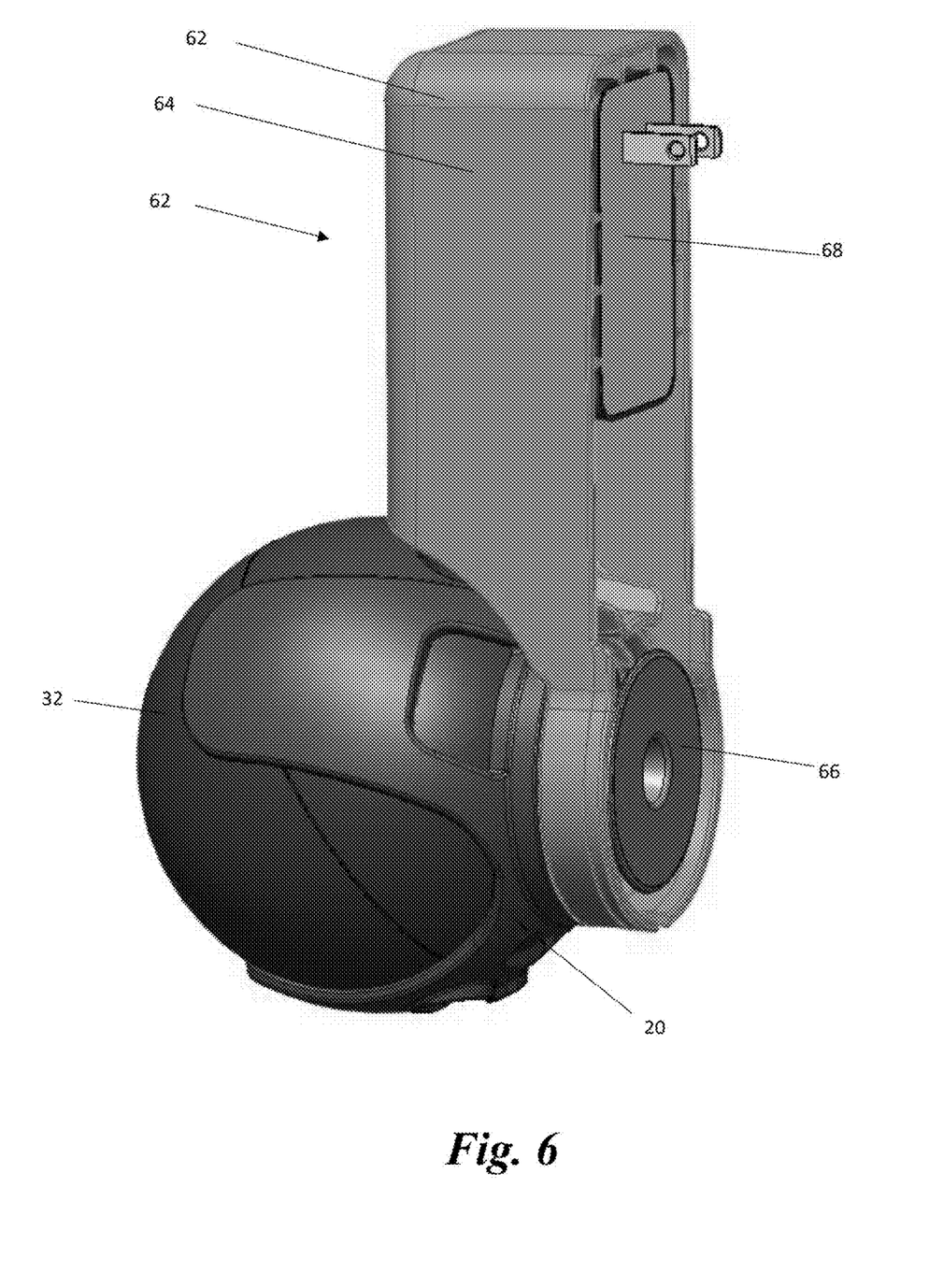
FIG. 6 is a rear isometric view of the mount of FIG. 5.

In FIGS. 5 and 6 there is depicted another embodiment of a mount 60 according to an embodiment of the invention. In the depicted embodiment, mount 20 as described above is attached to an electrical outlet hanger 62. Electrical outlet hanger 62 generally includes cover 64 and backing plate 66. Mount 20 is attached to backing plate 66, which is in turn retained in cover 64. Cover 64 is hung from power adapter 68. Operation of mount 20 is as described above.

Figure 7:
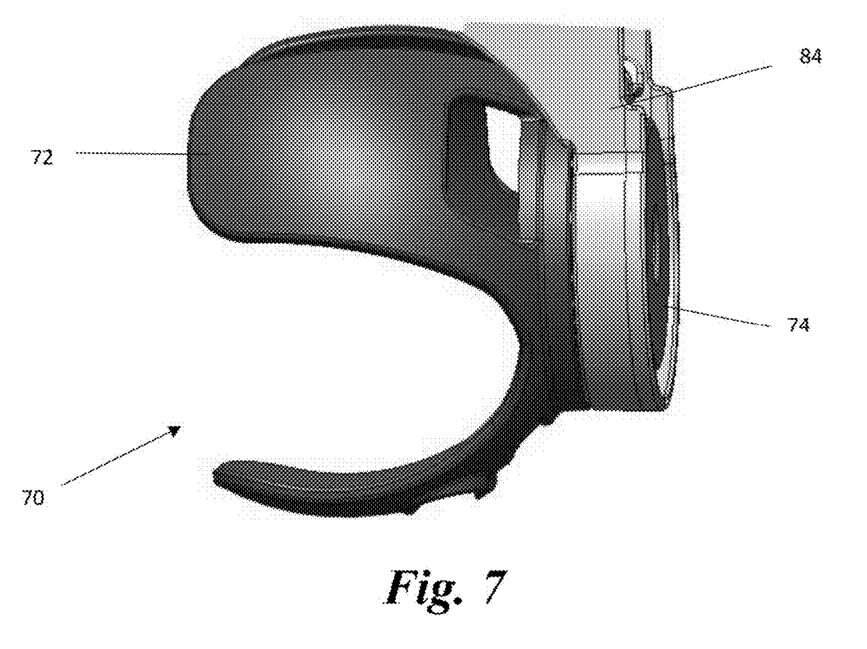
FIG. 7 is a side isometric view of a mount according to another embodiment of the invention.
Figure 8:
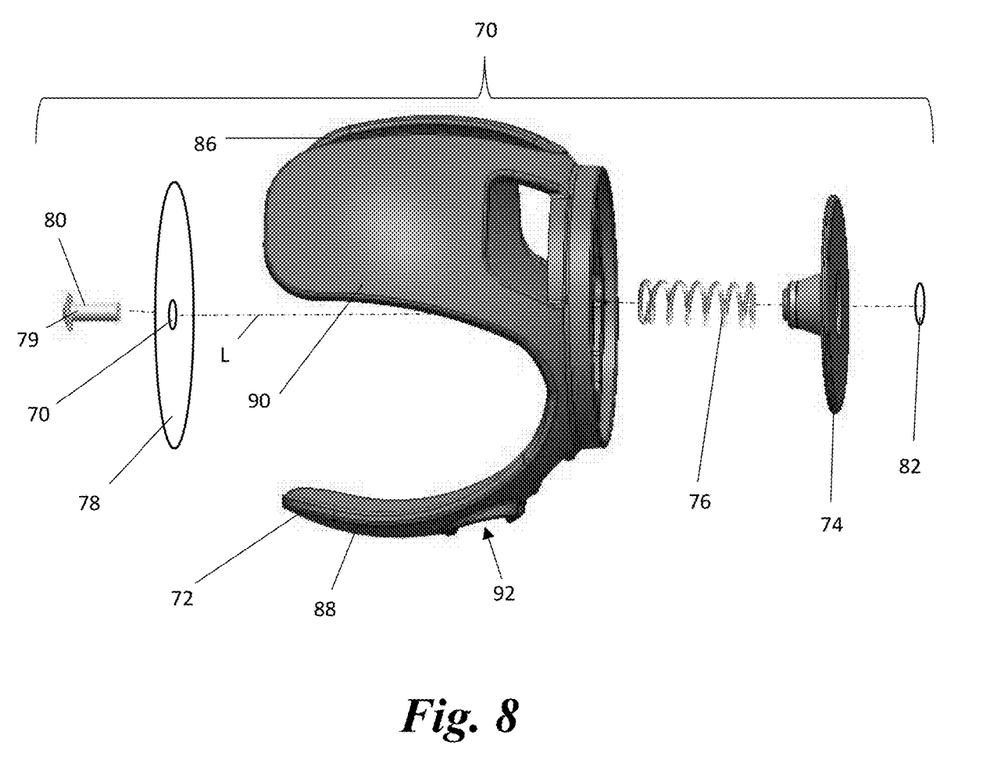
FIG. 8 is a partial exploded view of the mount of FIG. 7.
Figure 9:
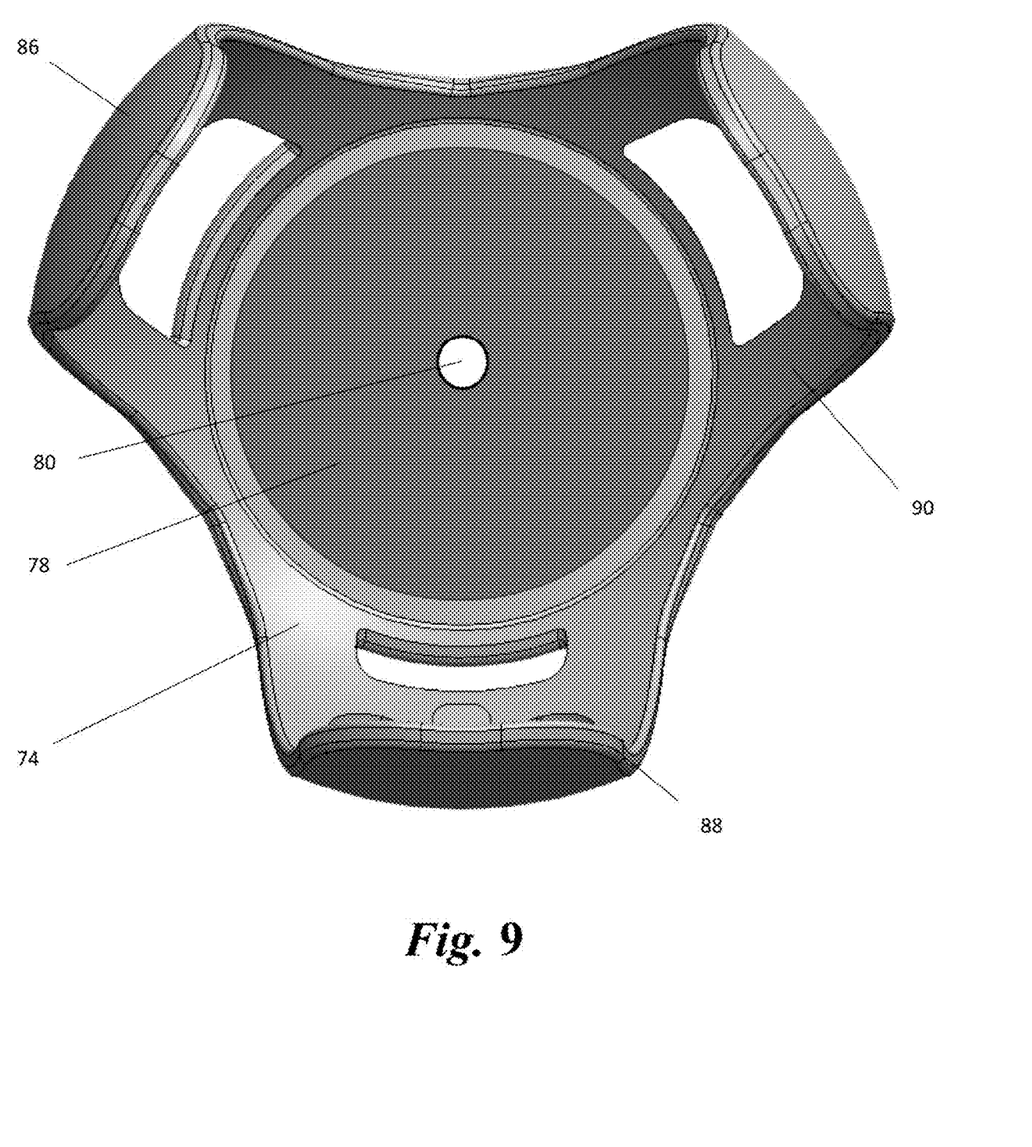
FIG. 9 is a front view of the mount of FIG. 8.

In FIGS. 7-9 there is depicted yet another embodiment of a mount 70 according to an embodiment of the invention. As depicted in the partially exploded view of FIG. 8, mount 70 generally includes device interface 72, backing plate 74, tension spring 76, retainer plate 78, a coupling pin 79 in the form of rivet 80 which defines a longitudinal axis L, and rivet retainer 82. Mount 70 further includes structure interface 84 as depicted in FIG. 7.

Again, device interface 72 has resilient device receiving prongs 86, 88, 90, for gripping and holding directional speaker 32. It will be appreciated that although directional speaker 32 is spherical, other shapes such as square, rectangular, trapezoidal, or any other geometric shape may be used, and prongs 86, 88, 90, may be adapted to grip and hold the device. In addition, although three prongs are shown, any other number of prongs, or other holding configuration conforming to the shape of directional speaker 32, such as a partial enclosure, may be used. Prong 88 defines aperture 92, enabling power and/or audio and data wires to be routed to directional speaker 32. Structure interface 84 can be secured to any structure such as a wall, support column, or other support with fasteners or by any other suitable means.

A biasing spring in the form of tension spring 76 is coupled to backing plate 74 and retainer plate 78 to bias device interface 72 toward structure interface 84. Coupling pin 79 is slidable in backing plate 74 to enable device interface 72 to be pulled outward from structure interface 84 against the bias of spring 76 and along longitudinal axis L up to the limit imposed by rivet retainer 82. When pulled out to this disengaged position, device interface 72 can be rotated to any desired position about longitudinal axis L, and once outward pressure is released, device interface 72 will return to a new rotational position. In this engaged position, device interface 72 abuts structure interface 84, and is retained in this position by tension spring 76. As such, device interface 72 can be freely rotated to any desired position relative to structure interface 84. If desired, detents (not depicted) can be provided between device interface 72 and structure interface 84 to provide for discrete positions in which device interface 72 can be positioned.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A mount for a smart device or directional speaker comprising:
    a device interface having a rear wall defining an opening with a periphery, a plurality of notches being defined in the periphery, the device interface further including a plurality of engaging ramps, each of the engaging ramps disposed adjacent to a separate one of the notches, and a plurality of resilient device receiving prongs projecting forwardly at an outer periphery of the rear wall; and
    a structure interface comprising a body presenting a contact surface, the body having an aperture for receiving a fastener to attach the body to a wall of a structure and a plurality of projecting engaging features spaced apart from the contact surface, the engaging features corresponding to the notches of the device interface and receivable therein, the structure interface being selectively rotatable relative to the device interface when the contact surface is abutted with the rear wall of the device interface to engage the engaging features with the engaging ramps to attach the device interface to the structure interface.

2. The mount of claim 1, wherein the engaging features are ovoid and oriented tangentially relative to a circle.

3. The mount of claim 1, wherein the plurality of device receiving prongs includes at least three resilient device receiving prongs.

4. The mount of claim 1, wherein the plurality of notches of the device interface includes six notches defined in the periphery of the opening in the rear wall, and the plurality of projecting engaging features of the structure interface includes six engaging features corresponding to the six notches.

5. The mount of claim 1, wherein at least one of the resilient device receiving prongs defines an aperture for receiving wires therethrough.

6. The mount of claim 1, further comprising an electrical outlet hanger, the structure interface being operably coupled to the electrical outlet hanger.

* * * * *